United States Patent [19]

Bianchi

[11] Patent Number: 5,244,190

[45] Date of Patent: Sep. 14, 1993

[54] VEHICLE WHEEL SUSPENSION METHOD

[75] Inventor: Mauro Bianchi, La Garde-Freinet, France

[73] Assignee: Mauro Bianchi S.A., Puteaux, France

[21] Appl. No.: 687,932

[22] PCT Filed: Oct. 5, 1990

[86] PCT. No.: PCT/FR90/00715
§ 371 Date: Aug. 5, 1991
§ 102(e) Date: Aug. 5, 1991

[87] PCT Pub. No.: WO91/04876
PCT Pub. Date: Apr. 18, 1991

[30] Foreign Application Priority Data

Oct. 5, 1989 [FR] France .................. 89 13240

[51] Int. Cl.[5] .................. B60G 11/32; B60G 17/00; B60G 15/06
[52] U.S. Cl. .................. 267/195; 267/217; 267/229; 267/248; 267/36.1; 267/273; 267/286
[58] Field of Search .................. 267/34, 70, 169, 174, 267/221, 224, 225, 228, 286, 287, 195, 273, 277, 188, 191, 154, 36.1, 41, 52, 158, 160, 120, 124, 217, 218, 186, 113; 280/670, 724, 696, 700, 721

[56] References Cited

U.S. PATENT DOCUMENTS 2,160,541  5/1939  Dubonnet .................. 280/696 X
3,559,976  2/1971  Jerz, Jr. .................. 267/290
3,984,119 10/1976  Okazima .................. 267/177 X

FOREIGN PATENT DOCUMENTS 522734  9/1953  Belgium .
2043512  3/1972  Fed. Rep. of Germany .
3410473 10/1984  Fed. Rep. of Germany .
437206  10/1921  France .
809336   3/1937  France .
1212305  3/1960  France .
1349851 12/1963  France .
2125217  9/1972  France .
1017851  5/1983  U.S.S.R. .................. 267/34
1401988  8/1875  United Kingdom .
349582   5/1931  United Kingdom .
485935   5/1938  United Kingdom .

OTHER PUBLICATIONS

Chironis, Nicholas P., ed. *Spring Design and Application*, McGraw-Hill Book Co., Inc. (1961) pp. 170 and 172.

Primary Examiner—Robert J. Oberleitner
Assistant Examiner—Josie A. Ballato
Attorney, Agent, or Firm—Young & Thompson

[57] ABSTRACT

The invention has for its object a suspension with dynamically variable flexibility or stiffness. The suspension process uses one or several elastic elements mounted opposite each other, so as to impress on the vehicle suspension a variation of stiffness or of flexibility having two slopes on the curve (shock-relaxation and compression effort) and the use of different stiffnesses or flexibilities is localized during operation of the suspension in the vicinity of the position of the loaded vehicle on its wheels and that the least stiffness is located on the second portion of the course of collapse of the wheel suspension. The invention is applicable to suspensions particularly for automotive vehicles.

9 Claims, 11 Drawing Sheets

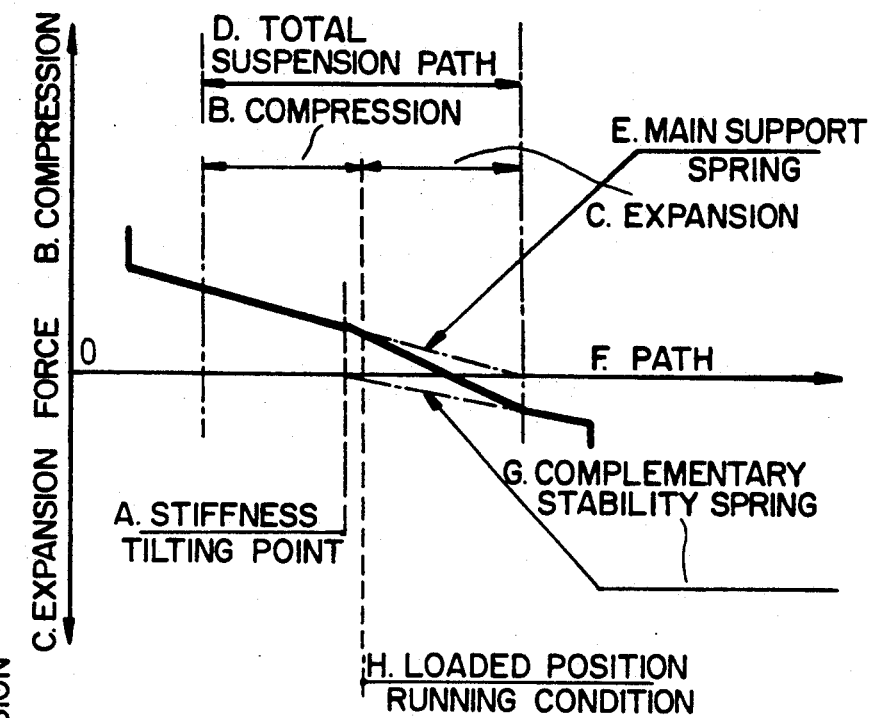
Fig_5
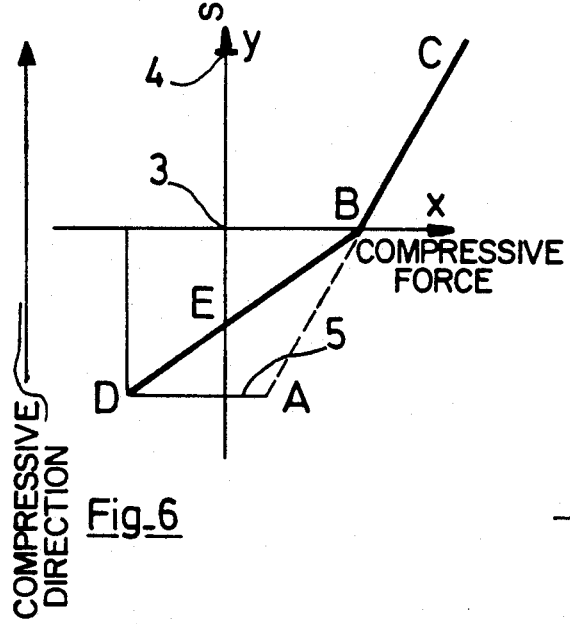
Fig_6
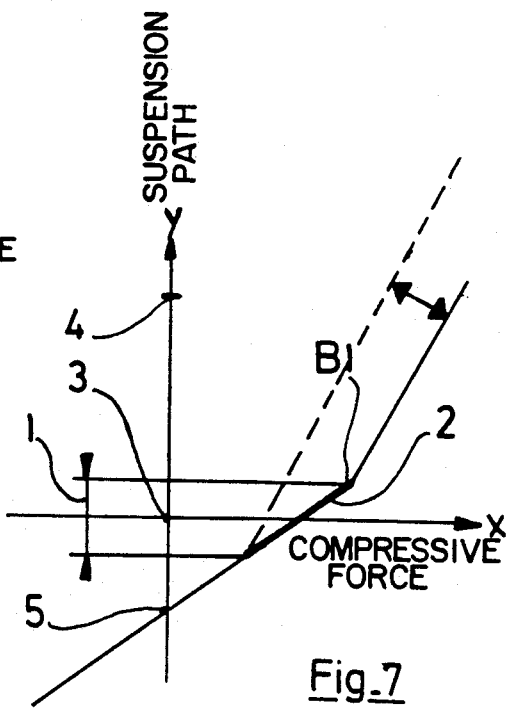
Fig_7

Fig_10

Fig_14

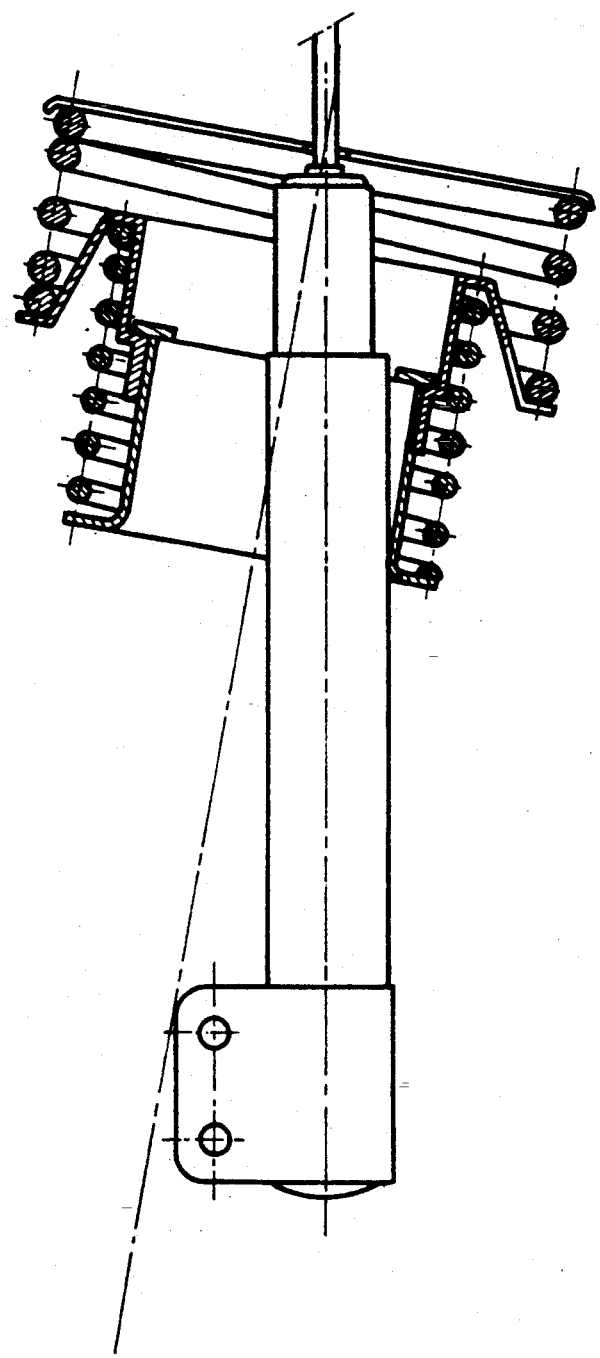
Fig_16

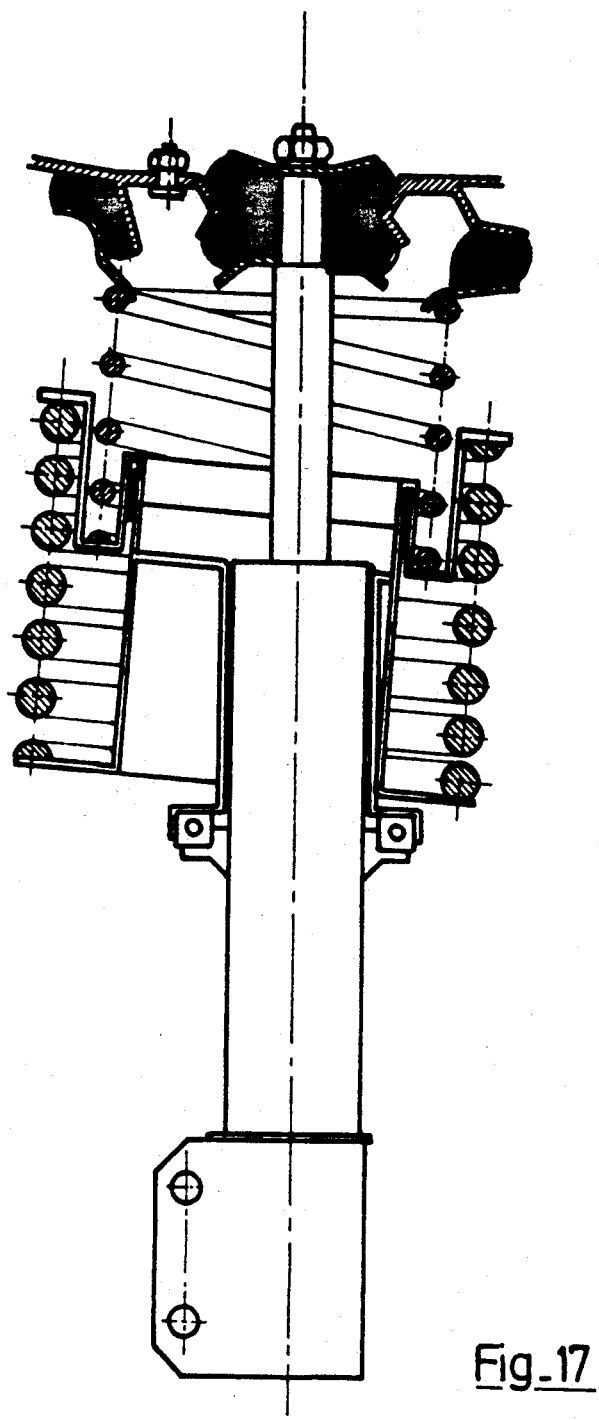
Fig_17

VEHICLE WHEEL SUSPENSION METHOD

FIELD OF THE INVENTION

The invention has for its object a suspension of dynamically variable flexibility or stiffness and whose flexibility is increased in the region in which the wheels are retracted, that is from the normal working position to the abutting position, and whose stiffness is increased from the normal working position to the position in which the wheel hangs free (or abuts a detent).

BACKGROUND OF THE INVENTION

The state of the art can be defined by various patents. All these patents describe means to vary the flexibility or stiffness as a function of the load of the vehicle. Other patents describe tilt correctors. These patents cause the intervention upon application of energy, of a mechanism which modifies the stiffness or the flexibility as a function of the load. Certain patents modify the stiffness or the flexibility as a function of the choice of driving mode (example: sports mode, family mode, etc. . . . ) By applying energy, the flexibility of the elastic elements can vary as a function of detectors (of direction, tilt, speed, etc. . . . ) The change of flexibility or of stiffness is applicable throughout the suspension.

In the very great majority of cases, the suspensions of automobiles are constituted by a combined "spring+-shock absorber" giving rise, at the level of the vehicle wheel, to a suspension force which increases in a constant manner with the collapse of the suspension. In other words, the stiffness or flexibility is constant (stiffness=delta F over delta L or a variation of force over variation of length), and this regardless of the nature of the spring used (the elastic element could be a helicoidal metal spring, a torsion blade or blades, or pneumatic, etc. . . . )

Nevertheless there are suspensions in which this stiffness varies as the load on the vehicle wheel. These suspensions are of so-called variable flexibility and all those known to the present rely on increase in stiffness upon increase of load on the vehicle wheel; this increase of stiffness is adapted better to control the maintenance of the "increased" mass of the vehicle. It can be obtained in various ways:

according to the oldest system (leaf springs), the curvature of the leaves may be adapted so that they act progressively;

in a helicoidal spring, in the same way, the pitch of the turns may be progressive so that these latter come into contact with each other one after the other during collapse;

in a helicoidal spring, there can also be different zones each of constant pitch, but of different values. The first part collapses until the turns touch, while only the second part continues to be compressed; this gives rise to two successive stiffnesses, the greater being at the end of collapse;

by kinematic bias, the stiffness at the level of the wheel can also be made to vary by varying the multiplication ratio relative to the spring;

in an oleopneumatic suspension, the volume of gas diminishes in the accumulator of the element giving rise to a variation of this volume which is more and more abrupt, from which the stiffness increases.

In these different well known examples, the stiffness always increases with collapse of the suspension. This increase of stiffness is ordinarily progressive.

The state of the art may be defined by the following patents:

FR-A-1.349.851: Suspension of a movable engine comprising one or several elements of usual deformable means, such as springs or other devices which can if desired be complex and buffered, acting either by contraction or extension or torsion of their filaments, materials or elastic fluids, so arranged that:

their elongation and corresponding charge may be different from those of subsequent expanders, namely predetermined within limits of loads defined or above an occasional predetermined surcharge;

the combination of the elastic elements permits any obstacle acting on one of these elements to provoke non-resonance of the engine below this obstacle and to benefit from the flexibility of several, that is, the assembly of the elements, that these adjustments and connections may be maintained within limits defined by a given surcharge or discharge at rest, namely a lower guard (or in the plane of displacement) of this engine.

This patent directs all its efforts to achieve non-resonance. Nothing is described which suggests the positioning and the value of the different regions of stiffness.

U.S. Pat. No. 3,559,976: this patent discloses an assembly of several springs permitting obtention of several stiffnesses. The springs are mounted in series and act in the same direction. Beyond a certain path during increase of the load, one of the springs is eliminated.

This operation is completely different from that of the process according to the invention.

FR-A-1.212.305: improvements in shock absorbers particularly characterized by the use of two springs, one for support, the other for reaction, and such that the characteristic of the assembly will not be linear, the resistance to vibrations increasing as the amplitude of these latter. When the load is applied, it is essential that the oppositely acting spring be non-compressed, but in a condition such that it can oppose an increasing resistance to the dynamic flexure, consecutively to the action of the vibratory forces which comprise it.

The concept of non-resonance seems ideal in this mounting adapted not to a vehicle suspension but to elastic pads for the maintenance of compressors or mechanisms of fixed machines, in which the movements to be absorbed are of constant or progressively variable frequency. The stiffness increases therefore rapidly and symmetrically about the point of static equilibrium, so as to "muzzle" any reaction arising from displacements of the mass (for example, the unbalance due to poor loading of a washing machine).

FR-A-809.336: torsional suspension, particularly for oscillating half spindles, characterized by one or several of the following features, taken separately or in combination:

1. A portion of the length of the spring bar can be placed out of service, only the remainder of the length acting as a spring;
2. At an appropriate point along the torsion bar is fixed an arm which, in torsion, bears on an abutment whose position relative to the arm can be changed as desired;
3. The abutment is provided in the form of a rotatable non-circular disk on the periphery of which comes to bear the arm of the torsion bar;

4. On the periphery of the disk are provided graduations determining the various positions of rotation of the arm of the torsion bar.

The operation is quite different from that of the suspension according to the invention because it again is a matter of the classic principle of increase of stiffness during increase of load on the vehicle (principle of classic suspension with variable flexibility).

BE-A-522.734: the novelty of the invention consists in that the chamber or low pressure space is placed above the piston of the shock absorber and in that the compensation chamber begins directly above the level of the oil. According to this arrangement, the high pressure space is located below the piston and is limited downwardly by the guides and the sealing means of the piston rod. It thus results, in contrast with the known shock absorber systems, that the high pressure space in the case of small losses of shock absorber liquid which otherwise immediately upset the operation, is not influenced by these losses, for example of oil, and as a result the high pressure path as well as the principal function of a shock absorber retains its full working capacity even in case of oil losses.

It thus concerns above all a shock absorber for a motorcycle suspension. In complement of the shock absorber (purely hydraulic), a spring installed about the shock absorber portion has been replaced by two springs of different stiffness, so as to obtain "increasing hardness" to avoid flattening of the suspension. It therefore is a matter of a "classic suspension with variable flexibility". A small spring, disposed in the shock absorber itself, is adapted to cushion the end of extension movement.

DE-A-2.043.512: elastic system for automotive vehicles, with springs, disposed one behind the other, supporting the vehicle body and with a blocking device for blocking one or several springs relative to the vehicle body, a detector measuring the speed of oscillation of the mass of the vehicle body being provided to actuate the blocking device, which "opens" periodically the blocking device when the speed of oscillation attains the value zero (point of reversal of the oscillation) and closes it after a half oscillation of two springs between which there is exerted the action of the blocking device (according to patent application P.1928 961.3 and DE 2 043 512), characterized by the fact that the hydraulic portions of the springs provided in the form of elastic oleopneumatic elements are connected by hydraulic connections and that the blocking device comprises the combination of valves to block or free the circulation of liquid, or even a blockable piston floating freely in the chamber under pressure of the hydraulic portion.

The elastic elements (hydropneumatic) are not mounted in opposition, but "disposed one behind the other" (or in parallel). There is a change of stiffness by neutralization of one of the elastic elements upon information received from a detector measuring the speed of oscillation of the vehicle body.

SUMMARY OF THE INVENTION

The novel aspect of the process according to the invention resides in the fact that it is roughly in the travelling condition of the vehicle that the stiffness is a maximum; more precisely, over all the path between the position "hanging wheels" to about the position "travelling condition". This maximum stiffness permits, as in sport and competition vehicles, a very good control of the tilt of the vehicle, while it is subjected to longitudinal and transverse accelerations horizontally imposed during braking, accelerations and cornering. But, contrary to sport vehicles, the process of the present invention permits this result without it being obtained at the price of comfort, because, during passage of the wheel over a bump in the road, the suspension is compressed over the portion of the course in which the stiffness is the least. The curves shown on the accompanying figures show the fundamental difference of the profile of thickness of the system relative to all known systems.

The suspension process of a vehicle wheel, according to the invention, uses one or several elastic members mounted in opposition or not relative to each other in the case in which there are several elastic elements, in the case of a single elastic element at least one abutment limits the operation of a single portion of said element; it imparts to the suspension of each of the vehicle wheels a variation of stiffness or of flexibility at two slopes on the curve (shock-relaxation and compressive force). The utilization of the different stiffnesses or flexibilities takes place dynamically and the point of inflection of the curve is localized during unloading of the suspension in the neighborhood of the position of the vehicle when the wheels are loaded; the least stiffness is located on the second part of the course of collapse of the wheel suspension.

The displacement of the point of inflection of the curve (shock-relaxation and compressive force) is effected by adjustment of the operational point of the suspension, such that said inflection point will be above or below the loaded position of the vehicle.

The greatest stiffness, located between the position "normal travel" and the position "wheels hanging", should have a value at least three times greater than that of the stiffness observed during retraction of the wheel, to the shock abutment.

In the case of a single elastic element, there is used an abutment/cup at a precise place of said spring, so as to obtain a stiffness curve with double slope. The abutment or abutments are in contact for a position adjacent the position when the vehicle is loaded, whereby, departing from this position, the abutments are disengaged and all of the helicoidal spring (R20+R30) is stressed during sinking of the suspension; while in the course of disengagement, the presence of an abutment limits the operation to the reduced portion of said helicoidal spring.

In the case of use of a single spring, a bearing cup is fixed to the level of the central coils of the spring, which permits distinguishing the upper part (R30) of the spring above the cup and the other part (R20) of this same spring below the cup. Portion (R30) of the spring is enclosed in a chamber and under compression between two abutments, both secured to the chassis of the vehicle. The portion (R20) of the same spring is positioned between the cup and another cup secured to the body of the shock absorber, itself secured to the end of the vehicle wheel shock absorber. This portion (R20) of the spring ensures the sustentation of the vehicle while receiving the thrust of the wheel and while bearing against the cup held in place by the pressure arising from the compression of the portion (R30) of the spring. This latter compression being greater than that of the portion (R20) when the vehicle is naturally on its wheels.

In the case in which the elastic element is a torsion bar, this latter comprises an abutment (B1) secured to said torsion bar which is placed in contact with an abutment (B2) secured to the chassis and this in a manner such that if the suspension is compressed, the two abutments (B1, B2) separate, from which there results a stress of the torsion bar along all of its length (L1). If the suspension becomes unbalanced, two abutments (B1, B2) remain in contact and the torsion bar will become relaxed only over a portion of its length (L2).

The position of the abutment (B2) on the chassis is subject to the load of the vehicle, which guarantees the optimum position of the inflection point of the stiffnesses relative to the tilt of the rolling vehicle no matter what its load.

In the case in which the elastic element is a single leaf spring, this latter comprises at least one abutment (B3) so positioned as to be opposite the detent of the leaf spring, so as to obtain a stiffness curve with a double slope; the abutment or abutments (B3) are placed in contact for a tilt close to the tilt of the loaded vehicle, whereby, departing from this position, the abutments (B3) are separated and all (L1) of the leaf spring is stressed during total retreat of the suspension, while in the course of relaxation, the presence of one or several abutments limits the operation on the reduced portion (L2) of said leaf spring.

The process according to the invention comprises a double acting spring whose upper chamber is connected to a principal sphere of suspension and the lower chamber is connected to an oppositely acting sphere. An electrovalve permits bringing into action, or not, the sphere connected to the lower part of the spring. The sphere gives rise to a force oppositely opposed to that of the principal sphere which ensures support of the vehicle.

The electrovalve is controlled as a function of the different parameters encountered in the operation of the vehicle. This is effected by permanent control of the pressure in the lower chamber of the jack.

The vehicle wheel suspension for carrying out the process uses one or several elastic elements mounted in opposition or not one relative to the other in the case in which there are several elastic elements; in the case of a single elastic element, at least one abutment limits the operation over a single portion of said element. The suspension uses a variation of stiffness or of flexibility of two slopes on the curve (shock-relaxation and compressive force). The use of different stiffnesses or flexibilities is effected dynamically and the point of inflection of the curve is localized at the time of the relaxation of the suspension in the neighborhood of the vehicle position when running. The least stiffness is located on the second portion of the curve for collapse of the wheel suspension. The greatest stiffness, located between the "normal running" and "wheels hanging" position, should have a value at least three times greater than that of the stiffness encountered during retraction of the wheel, up to the point of shock abutment.

One of the embodiments uses two elastic elements opposed to each other and whose composition of the flexibilities gives rise, at the level of the vehicle suspension, to a curve of flexibility with two slopes. It is the principle of these two slopes which comprises the novelty of the system and which imparts a novel characteristic relative to all the suspension systems known and used to date. Although all these systems, when they rely on a variation of flexibility, have a suspension stiffness which increases in the direction of collapse of the suspension, the suspension process according to the invention has a maximum stiffness during the course of the wheel which is located from the "wheel hanging" position to a position adjacent that corresponding to the "vehicle loaded on its wheels"; this stiffness falls substantially when the vehicle wheel is brought from "this loaded position" to the position in which it is compressed up to shock abutment.

BRIEF DESCRIPTION OF THE DRAWINGS

The accompanying drawings are given by way of illustrative example and are not limiting. They show a preferred embodiment according to the invention. They permit easy understanding of the invention.

FIG. 5 is a view of the stiffness curve with two slopes according to the invention.

FIG. 6 is a view of a suspension curve according to the invention transposed with, on the abscissa, the compressive force and, on the ordinate, the position of the shock abutments 4 and of the relaxation abutments 5.

FIG. 7 shows the displacement of the point of inflection B1 as a function of adjustments of the operation of the suspension, such that this inflection point B will be above or below the loaded position of the vehicle.

FIG. 16 is an application of the wheel suspension according to the invention, to a suspension of the MacPHERSON (registered trademark) type.

FIG. 17 is a modified form of the suspension process for suspension of the MacPHERSON (registered trademark) type.

DETAILED DESCRIPTION OF THE INVENTION

To describe the operation of the contractive suspension according to the invention, we will begin by an analysis of the system with two opposed springs.

REVIEW OF THE PRINCIPLE OF OPERATION WITH TWO SPRINGS MOUNTED IN OPPOSITION (see FIGS. 1 and 2):

Let us imagine two springs R1, R2 prestressed one against the other maintained between two abutments.

To facilitate understanding, the two springs R1, R2 are identical and shown in a condition free from each other.

If we urge the point of contact 6 upwardly or downwardly, one spring will be compressed while the other will decompress. In the compressed spring, the force which opposes displacement increases while in the other spring, the force which aids in displacement decreases. That results in two force variations which are the same as if the two springs R1, R2 were compressed together. Therefore, one adds the two stiffnesses.

Beyond the path x, the spring which decompresses achieves its free state and the pressure of this latter (which is added to the pressure at the point 6) fades out. From this moment, only a single spring is stressed and therefore there is a single stiffness; from then on, there is a break in the overall curve in the sense of greater flexibility.

Figure 1:
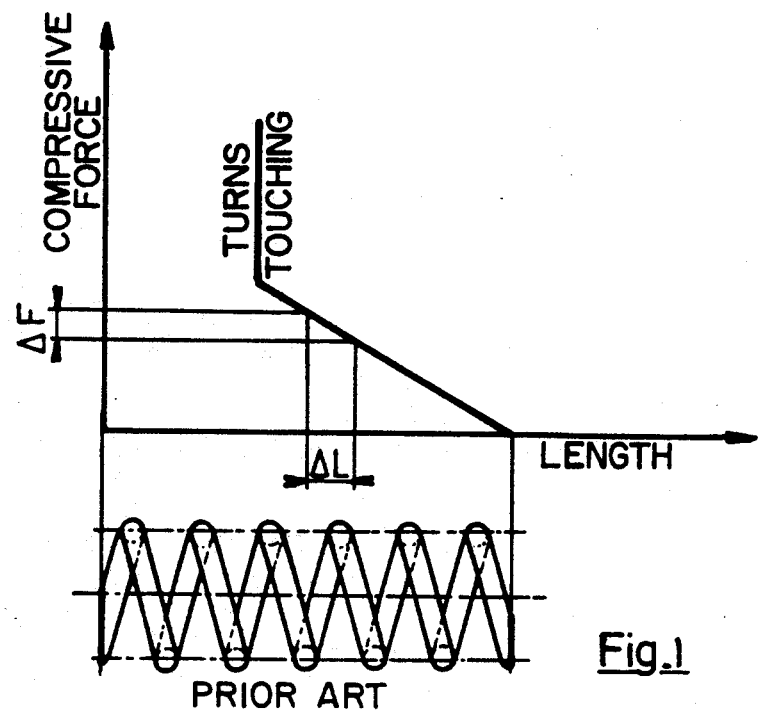
FIG. 1 shows schematically the characteristic of a spring with a curve (compressive force-length).
Figure 2:
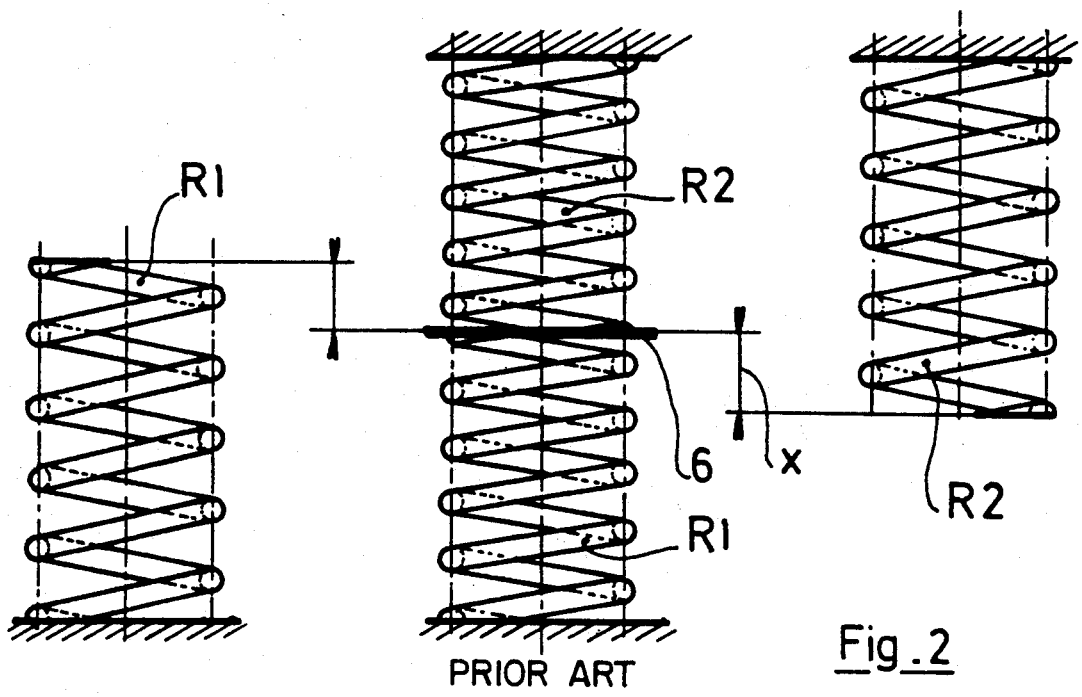
FIG. 2 is a view of these two opposed springs free and two springs mounted in opposition and prestressed.

I—There will first be examined the characteristic of a classical helicoidal spring with constant stiffness (FIG. 1). There will be observed a constant stiffness slope between the free state and the state in which the turns touch each other.

$$\text{Flexibility} = \frac{\Delta L}{\Delta F}$$

$$\text{Stiffness} = \frac{\Delta F}{\Delta L}$$

Figure 3:
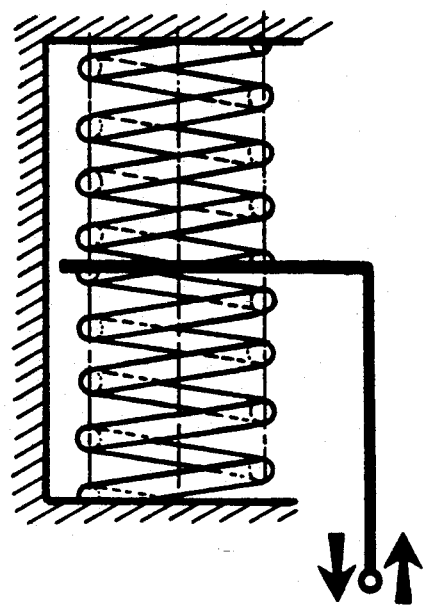
FIG. 3 is a view of two springs for elastic elements in opposition to each other and prestressed.
Figure 4:
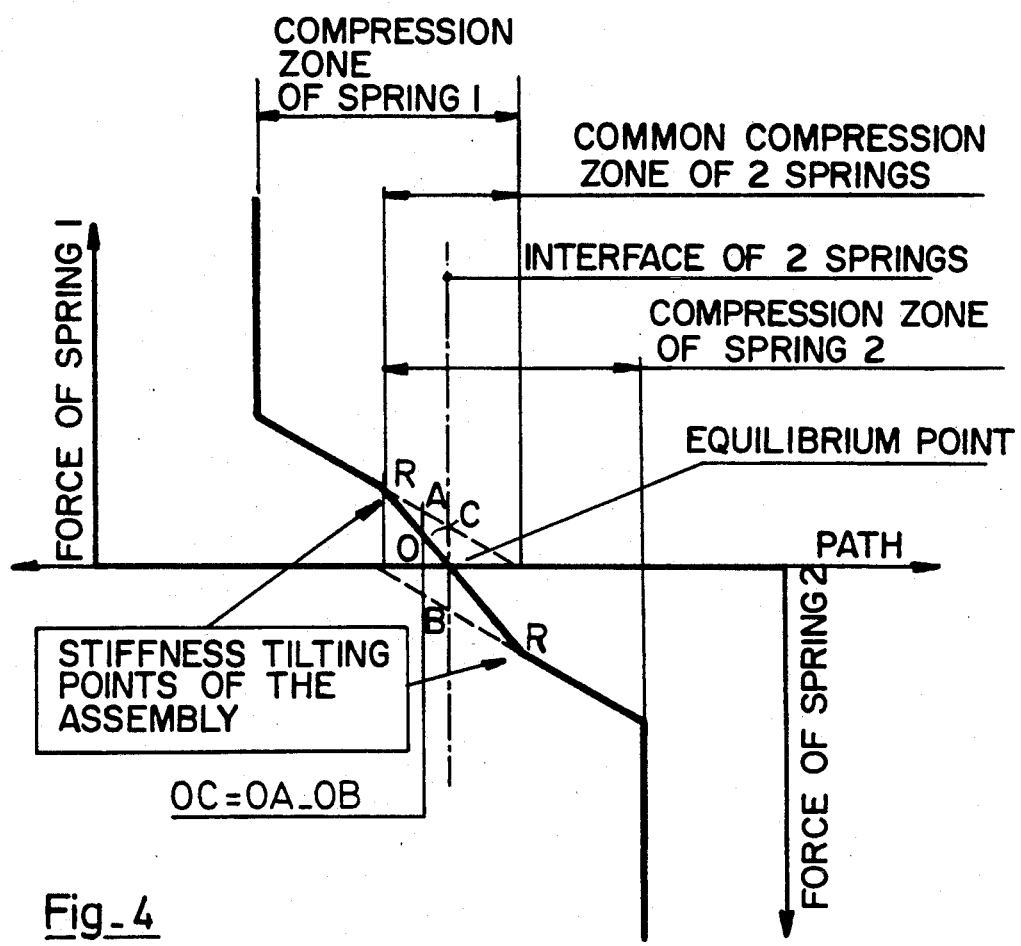
FIG. 4 is a graphic representation of the assembly of the two curves (one of them reversed) of the two springs on each other.

II—Two springs are installed opposite each other under prestress (FIG. 3) and let there be imagined a suspension arm secured to the interface of these two springs (themselves in abutment on the chassis by their fixed end). This is graphically translated by assembling in opposition (one of them reversed) the two characteristics of the springs bearing on each other (FIG. 4).

There will be observed two values of stiffness:
a high stiffness while the two springs are under constraint (sum of the two stiffnesses of the springs);
a lower stiffness when the springs achieve their free state (stiffness of a single spring).

III—Adapting the respective characteristics of each of the springs and positioning the curves of utilization in a suitable way, there is obtained the curve of stiffness with two slopes which characterizes the suspension according to the invention (FIG. 5).

It remains only to vary the expression of this latter graphically in FIG. 5 to obtain the suspension characteristic (FIG. 6) compared to the known ones.

It is important to note that the function of the suspension according to the invention has nothing in common with all the preceding suspensions which aim to correct tilt. No energy is utilized during change of the load of the vehicle to be stopped. The process according to the invention resides solely in the use, dynamically, of two stiffnesses which are different and localized during unloading of the vehicle suspension.

In modified forms of the process, there can be foreseen adjustment of the break point of the curve of stiffness relative to the load of the vehicle.

The difference between certain systems for correction of tilt using opposed fluid pressures resides in the fact that, in these latter, it is at the price of slow correction that the overall stiffness (and resultant of the two opposed stiffnesses) of the suspension develops, the change of stiffness taking place over all the course of suspension and as a function of the load of the vehicle.

The principle of the two suspension stiffnesses or the curve of flexibility with two slopes is illustrated on the curve shown in FIG. 6.

a) On this curve, the profile of a classic suspension is shown by the straight curve A,B,C (in broken line from B to A). The variation of load is constant, that is flexibility (or stiffness) is constant. Most often, a prestress of the spring already exists in the abutment position of unloading 5. If the vehicle takes a bump, the suspension can if desired extend to strike the detent abutments and the pressure of the elastic element (or spring) will be present during all of the course of expansion.

b) On the curve from B to C, the stiffness of the suspension is identical to that of a known vehicle. The passage over a bump operates substantially in the same comfort conditions. By contrast, the stiffness is substantially higher during course of expansion D,E,B. Not only is no prestress observed in the hanging wheel position, but on the contrary, a force in the opposite direction is necessary to bring the suspension to the expansion abutments 5. If the vehicle takes a bump, the pressure of the elastic element (or rather the assembly of elastic elements) will be present only over a portion of the course of expansion (from B to E). From point E, the vehicle wheel, instead of striking a retention abutment, will have a reversed stiffness from E to D which will be of the same value as from B to E.

On the graph, the point B corresponding to the change of stiffness has been located, to facilitate understanding, very nearly at the position of loaded suspension of the vehicle.

In practice, this point B will be, so as to promote adjustment during operation of the suspension, located differently above or below at B1 from this loaded position of the vehicle (see FIG. 7).

There can particularly be provided a substantial improvement of the travel position of the vehicle with adjustment according to the embodiment shown in FIG. 7.

The point 3 is the point of the loaded vehicle, X shows the compressive force and Y the path of suspension with shock abutment at the point 4 and the expansion abutment at 5. It will be observed that the path of suspension 1, used on a surface of current quality, will be located entirely in the region of high stiffness 2. This configuration corresponds to the technique used in sports vehicles, well known vehicles having a bearing which favors travel over comfort. These vehicles were notable for lack of sway and brake or accelerate without large variations of inclination. On the other hand, their suspension does not absorb irregularities of the surface.

With the process according to the invention, there is the benefit of the same attitude of the vehicle. On the other hand, when a vehicle wheel encounters a bump, the suspension instantaneously leaves the region of high stiffness to operate at a usual comfortable stiffness, which permits the vehicle to preserve its level of comfort heretofore incompatible with the level of quality observed during travel.

Figure 8:
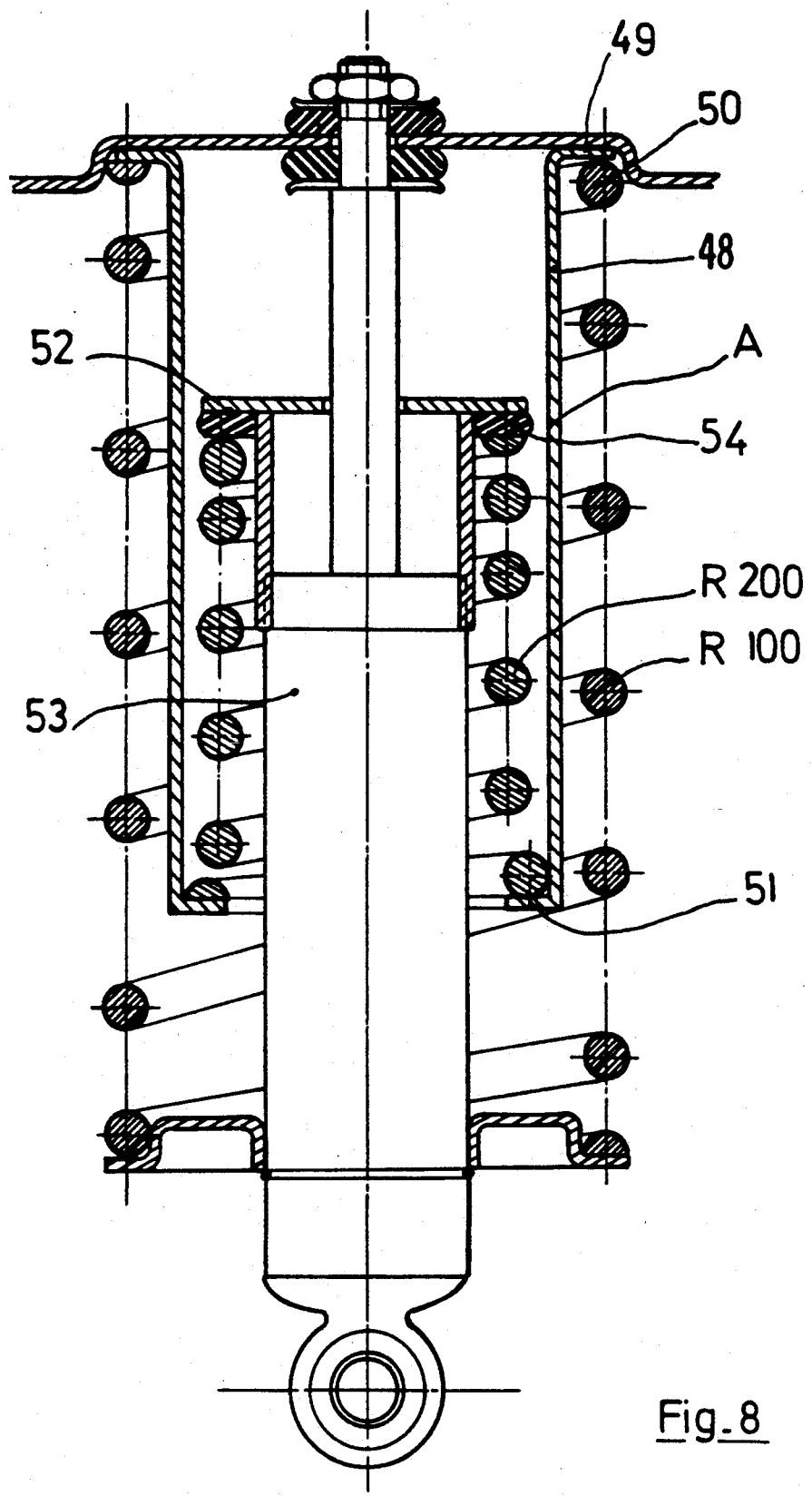
FIG. 8 is a view of an embodiment with two springs installed concentrically about the shock absorber.

EXAMPLE OF EMBODIMENT WITH TWO SPRINGS INSTALLED CONCENTRICALLY ABOUT THE SHOCK ABSORBER (see FIG. 8).

This mounting is interesting in that it does not require large modifications of the structure of the vehicle.

It will be seen in FIG. 8 that the two springs are in compression one against the other through a tubular member 48 of which one abutment 49 is trapped between the upper end 50 of the main spring R100 and its abutment on the chassis, while the other internal abutment 51 of this same tubular member 48 carries the auxiliary spring R200. A cup 52 secured on the body of the shock absorber 53 comes to bear against the auxiliary spring R200 during the course of expansion of the suspension. This abutment is provided by an elastomeric insert 54 adapted to avoid noise which could be generated during contact between the auxiliary spring R200 and the cup 52.

Figure 9:
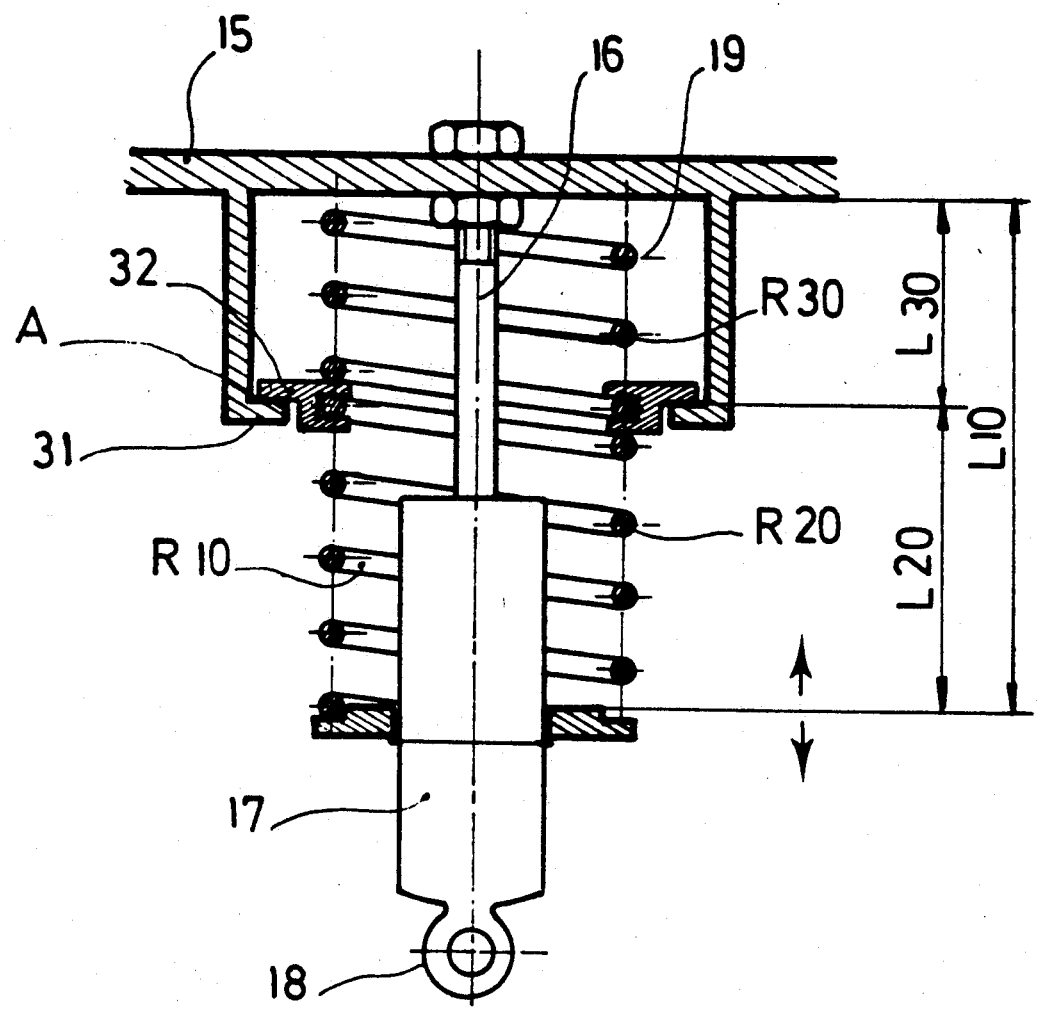
FIG. 9 is another embodiment of the suspension for the single (helicoidal) spring and its abutments.

EXAMPLE OF EMBODIMENT OF THE SAME OPERATION IN WHICH A SINGLE SPRING IS STRESSED AT THE LEVEL OF A TURN OF ITS CENTRAL PORTION (see FIG. 9).

FIG. 9 shows a mounting for a single spring R10 which permits providing a suspension according to the invention.

A bearing cup 32 is fixed on one of the central turns of the spring, which permits distinguishing the upper portion R30 of the spring above the cup and the other portion R20 of this main spring below the cup. The portion R30 of the spring R10 is enclosed in the chamber 19 and is under compression between two abutments, both secured to the chassis 15 of the vehicle. The portion R20 of the same spring R10 is positioned between the cup 32 and another cup secured to the shock absorber body 17, itself secured at its end 18 to the vehicle wheel. This portion R20 of the spring ensures the sustentation of the vehicle while receiving the pressure of the wheel and transmitting it to the cup held in place by the pressure generated by the compression of the portion R30 of the spring; this latter compression being superior to that of the portion R20 when the vehicle is naturally on its wheels.

In the neighboring position to that during travel, the spring portion R30 (L30) is enclosed and under compression, therefore inactive.

Between this position and the hanging wheel position of the suspension, only the portion L20 of the spring R20 is a part of the system, from which results high stiffness.

Between this position and the complete compression of the suspension, the bearing cup 32, secured to the spring R10, leaves its abutment at 32 and all L10 of the spring R10 contributes to what can be called a reduced stiffness.

There will therefore be seen a curve of flexibility with two slopes with the greatest flexibility between the working position of the suspension and the compressed abutment position thereof.

Figure 10:
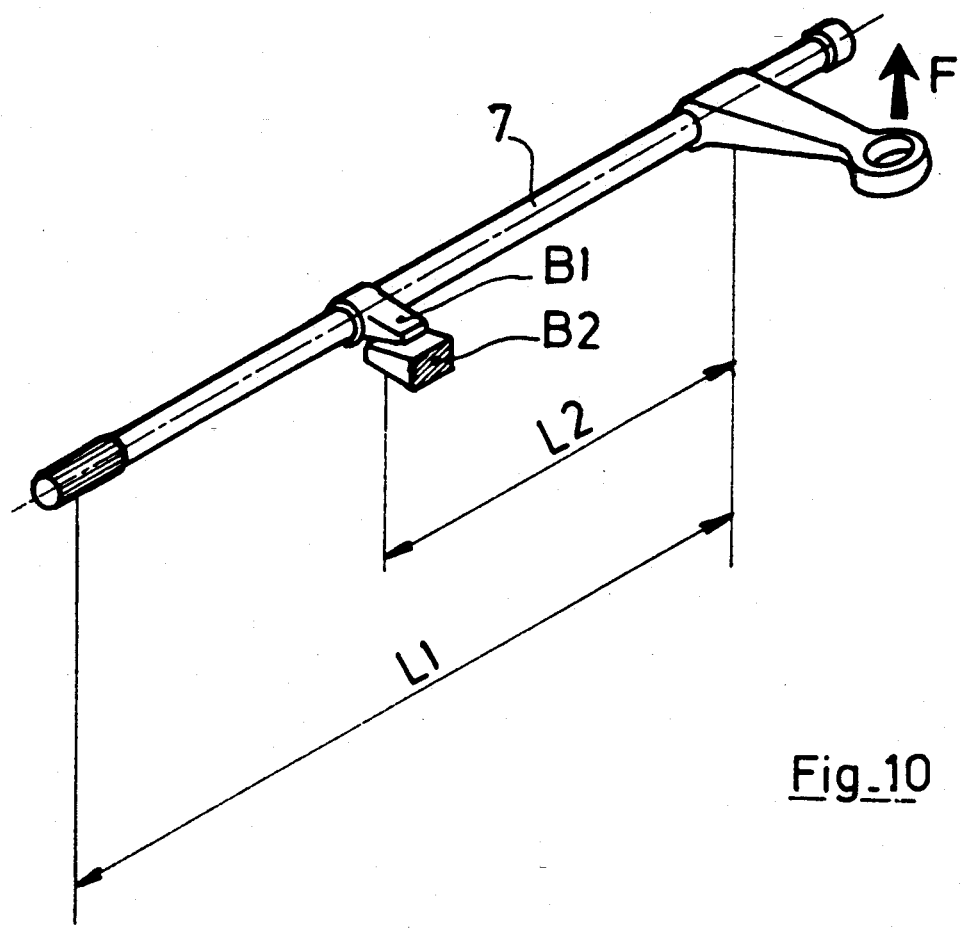
FIG. 10 is a view of an embodiment with a torsion bar.

EXAMPLE OF OBTAINING THE SAME OPERATION ACCORDING TO ANOTHER EMBODIMENT WITH A TORSION BAR (see FIG. 10).

The torsion bar is shown in a position adjacent the loaded condition of the vehicle, the abutment B1 secured to the bar is in contact with the abutment B2 secured to the chassis.

If the suspension is compressed (direction of arrow F), the two abutments B1, B2 separate and the torsion bar 7 is stressed over all its length (L1). If one relaxes the suspension, the two abutments B1, B2 remain in contact and the torsion bar 7 expands only over a portion (L2) of its length.

There will therefore be observed, as with the two springs R1, R2, mounted in opposition, an inflection of the curve of flexibility at the level of contact of the abutments B1, B2; the greatest flexibility is located between the "vehicle loaded" position and the position "compressed to shock abutment".

To perfect the process, one should subject the position of the abutment B2 on the chassis to the load of the vehicle, which guarantees the optimum positioning of the inflection point of the stiffnesses relative to the tilt of the rolling vehicle no matter what its loading condition.

Figure 11:
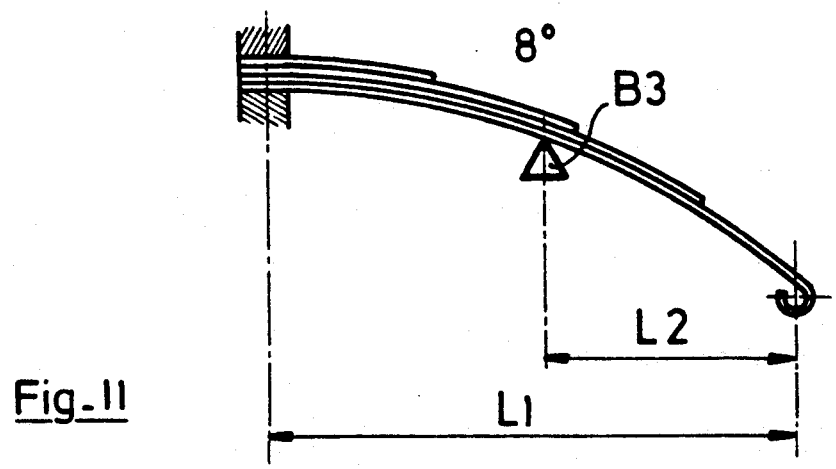
FIG. 11 is a view of an embodiment according to the invention with a leaf spring. The spring shown is an actual half spring.
Figure 12:
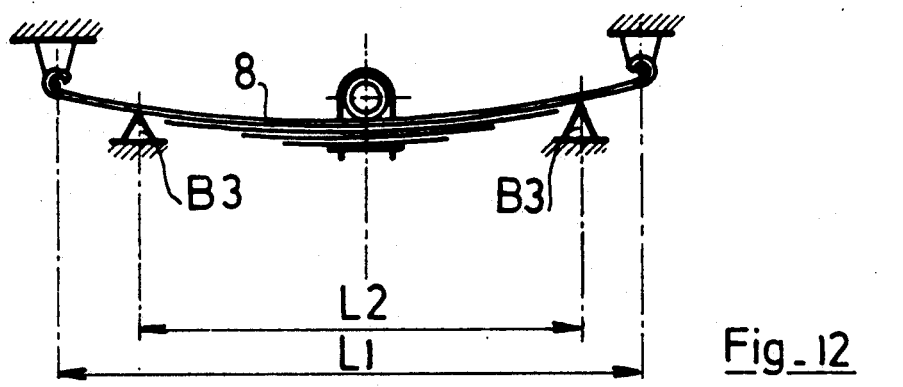
FIG. 12 is another embodiment according to the invention, with a leaf spring shown in its entirety with two abutments.

EXAMPLE OF OBTAINING THE SAME OPERATION WITH A LEAF SPRING (see FIGS. 11 and 12).

In the same way as with a torsion bar, one can, by positioning an abutment B3 at a precise place on a leaf spring 8, obtain a stiffness curve of double slope.

As with a torsion bar, the abutment or abutments B3 are in contact for a tilt near that of the loaded vehicle. Departing from this position, the abutment B3 disengage and all the length (L1) of the leaf spring 8 is stressed upon total collapse of the suspension; while during the course of relaxation, the presence of one or several abutments limits the operation over the reduced portion L2 of the spring.

Figure 13:
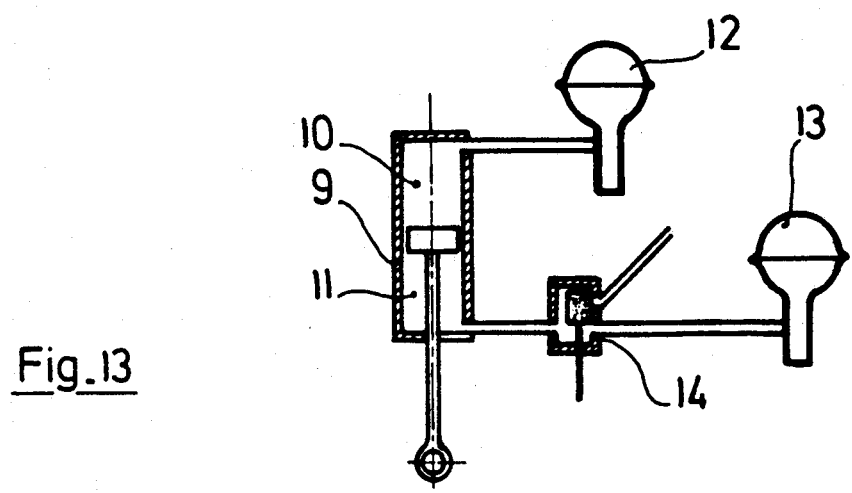
FIG. 13 is a view of the suspension according to the invention, adapted to a hydraulic suspension.

EXAMPLE OF OBTAINING THE SAME OPERATION WITH A HYDRAULIC SUSPENSION (see FIG. 13).

The effect is obtained by using a double acting jack 9 and connecting each of the chambers (upper 10 and lower 11) to a suspension sphere 12, 13.

An electrovalve 14 permits bringing into action, or not, the sphere 13 connected to the lower part of the jack 9. Said sphere 13 gives rise to a force opposed to that of the principal sphere 12 which ensures sustentation of the vehicle. This electrovalve 14 can thus be, in its simplest form, subject to the suspension.

One version can consist in electronically controlling the electrovalve with greater sophistication as a function of the different parameters encountered in the operation of the vehicle.

This is effected by permanent control of the pressure in the lower chamber 11 of the jack 9.

The fundamental novelty of the suspension according to the invention resides in the use of two stiffnesses, during relaxation of the vehicle wheel: two stiffnesses positioned oppositely to that which has been done until the present, in suspension material of variable flexibility and two stiffnesses positioned with extreme precision over the path of the suspension. These two stiffnesses, shown graphically in FIGS. 5, 6, 7, are present in the form of a curve expressed by two consecutive slopes, interconnected by an inflection point (see FIG. 7).

The inflection point is located generally speaking in the vicinity nearest the position for travel of the vehicle. This position is determinative of the good operation of the suspension according to the invention. This has been verified in several embodiments already provided on test vehicles. The testing has also permitted verifying that the higher stiffness located between the "normal running" position and the "wheels hanging" position should have a value at least three times greater than that of the stiffness observed during retraction of the wheel, up to its shock abutment. The values of the two stiffnesses have a ratio of at least 3 to 1. On two vehicles provided with suspensions according to the invention at a level of operation previously considered very satisfactory, the following data have been obtained:

I—For a small sports coupe of the model "GTI", weighing about 890 kg, in operative condition, according to a distribution AV/AR of the order of 525 kg in front/365 kg behind, the stiffnesses of the suspension stabilize at:

| STIFFNESS | FORWARD SUSPENSION (at the wheel) | REAR SUSPENSION (at the wheel) |
|---|---|---|
| Compression path | 1.43 kg/mm | 1.55 kg/mm |
| Expansion path | 4.70 kg/mm | 6.09 kg/.m |
| Ratio | 3.29 | 3.93 |

II—On a large motor sedan, weighing approximately 1,350 kg, when running, according to a distribution AV/AR of the order of 800 kg forwardly/550 kg rearwardly, the suspension stiffnesses stabilize at:

| STIFFNESS | FORWARD SUSPENSION (at the wheel) | REAR SUSPENSION (at the wheel) |
|---|---|---|
| Compression path | 2 kg/mm | 2.13 kg/mm |
| Expansion path | 7 kg/mm | 6.66 kg/mm |
| Ratio | 3.5 | 3.12 |

Different systems, principally mechanical, which could equally be embodied hydraulically or electronically, are cited in the description of the invention. The first cited relates to two opposed springs, it has the advantage of isolating the parameters in terms of stiffness, thereby making its use easier. The first embodiments have thus been given but it is nevertheless possible to consider that the industrial embodiments will utilize much simpler springs without departing from the scope of the invention.

Figure 14:
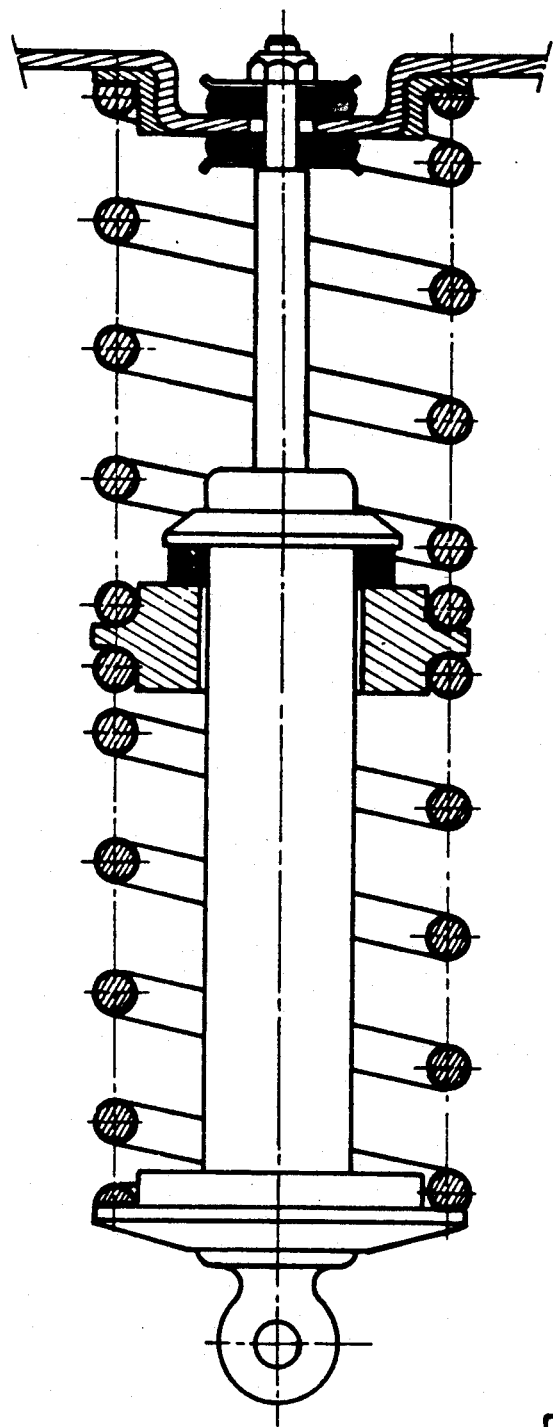
FIG. 14 is a view of the suspension according to the invention in which the single spring, or elastic element, has been replaced by two springs in series, the suspension has a securement point by an eyelet, and the other securement point by a gudgeon-mounted silent block.
Figure 15:
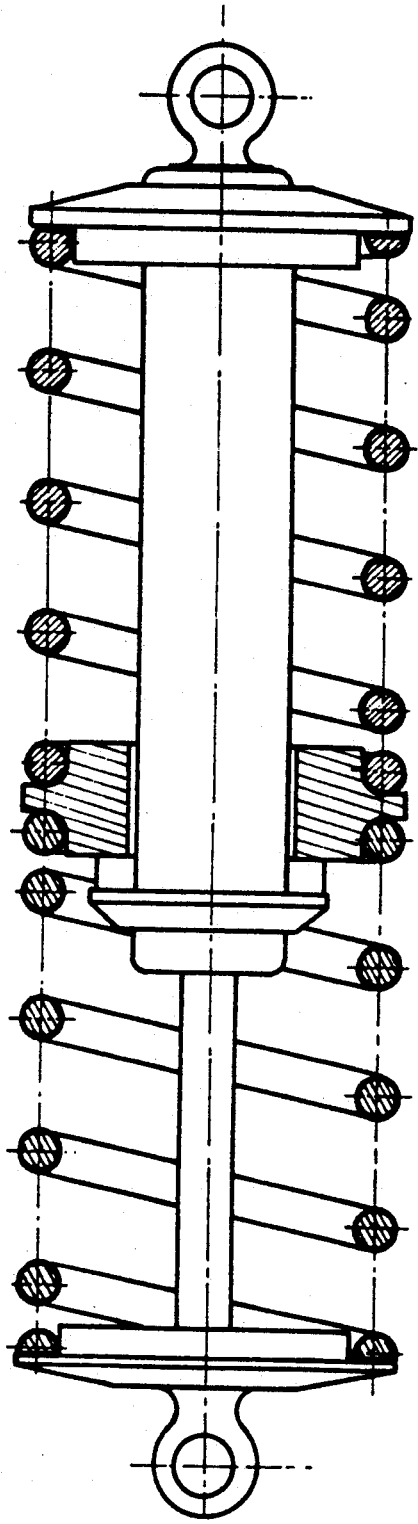
FIG. 15 is a view of the suspension according to the invention in which the spring, or single element, has been replaced by two springs in series, said suspension has its two securement points which terminate in eyelets.

FIGS. 14, 15 and 16 show the replacement of a single spring, such as shown in FIG. 9, by two springs mounted in series with a floating cup. There is obtained a total length L10 of the assembly, a length L20 for one spring and a length L30 for the other spring mounted in series.

FIG. 17 is an application of the wheel suspension according to the invention, to a modified form of the MacPHERSON ® type suspension.

I claim:

1. Suspension process for a vehicle wheel having a suspension and at least one elastic member, which comprises: imposing on the suspension of each of the wheels of the vehicle a variation of stiffness having two slopes on a shock-relaxation and compressive force curve, said curve having a point of inflection, localizing said point of inflection during relaxation of the suspension at a position of the vehicle when the wheels are loaded, so that the greatest stiffness, which is located between a "normal running" position and a "wheels hanging" position, has a value at least three times greater than that of the stiffness observed during retraction of the wheel, and so that the least stiffness is located on a second portion of a course of collapse of the wheel suspension.

2. Process according to claim 1, wherein a single helicoidal spring is used as the elastic element, and at least one abutment limits the operation of a portion of the helicoidal spring at a precise point on said spring, so as to obtain a stiffness curve with a double slope, said at least one abutment comes into contact for a tilt corresponding to a position of the vehicle when the wheels are loaded, such that, departing from this position, said at least one abutment is separated and all of the helicoidal spring is stressed during total compression of the suspension, while during expansion, said at least one abutment limits the operation over a reduced portion of said helicoidal spring.

3. Process according to claim 1, wherein a single helicoidal spring is used as the elastic element, and a bearing cup is secured at a central level of the coils of the spring, which permits distinguishing an upper portion of the spring above the cup and a lower portion of the spring below the cup; said upper portion of the spring being enclosed in a chamber and under stress between two abutments, both secured to the vehicle; said lower portion of the spring being positioned between the cup and another cup secured to the body of a shock absorber, said shock absorber being secured to an end of the vehicle wheel; said lower portion of the spring ensuring the suspension of the vehicle while receiving the pressure of the wheel and bearing on the cup held in place by a pressure engendered by the compression of the upper portion of the spring.

4. Process according to claim 1, wherein said at least one elastic element is a torsion bar, said torsion bar comprising an abutment secured to said torsion bar which is in contact with a second abutment secured to the vehicle in such a manner that if the suspension is compressed, the two abutments separate the torsion bar along all of its length; and, if the suspension is relaxed, the two abutments remain in contact and the torsion bar expands along only a portion of its length.

5. Process according to claim 4, wherein the second abutment is positioned on the vehicle as a function of the load of the vehicle, thereby guaranteeing the optimum positioning of the point of inflection of the stiffnesses relative to the tilt of the rolling vehicle no matter what its load level.

6. Process according to claim 1, wherein said at least one elastic element is a single leaf spring, said leaf spring comprising at least one abutment so positioned so as to oppose the detent of the leaf spring, and so as to obtain a stiffness curve with a double slope, said at least one abutment coming into contact for a tilt corresponding to a position of the vehicle when the wheels are loaded, such that, departing from this position, said at least one abutment becomes separated and all of the leaf spring is stressed during total collapse of the suspension; while during expansion, said at least one abutment limits the operation to a reduced portion of said leaf spring.

7. Process according to claim 1, further comprising a double acting jack having an upper chamber connected to a principal suspension sphere and a lower chamber connected to an oppositely-acting sphere, permitting through an electrovalve entry into action or inaction of the oppositely-acting sphere connected to a lower portion of the jack; said oppositely-acting sphere giving rise to a force opposed to that of the principal sphere which ensures support of the vehicle.

8. Process according to claim 7, wherein the pressure in the lower chamber of the jack is permanently controlled by controlling the electrovalve as a function of different parameters detected during operation of the vehicle.

9. Vehicle wheel suspension for carrying out a suspension process of the vehicle having a suspension and using at least one elastic member comprising: means for imposing on the suspension of each of the wheels of the vehicle a variation of stiffness having two slopes on a shock-relaxation and compressive force curve, said curve having a point of inflection, means for localizing said point of inflection of said curve during relaxation of the suspension to a position of the vehicle when the wheels are loaded, whereby the least stiffness is located on a second part of a course of collapse of the wheel suspension, and the highest stiffness is located between a "normal running" position and a "wheels hanging" position, said highest stiffness exhibiting a value at least three times greater than that of the stiffness when the wheels are retracted.

* * * * *